(12) United States Patent
Hutchinson et al.

(10) Patent No.: US 11,396,608 B2
(45) Date of Patent: Jul. 26, 2022

(54) COMPOSITIONS FOR REMOVING SUPPORT MATERIAL FROM A 3D-PRINTED OBJECT AND METHODS OF MAKING THEREOF

(71) Applicant: PostProcess Technologies, Inc., Buffalo, NY (US)

(72) Inventors: Daniel Joshua Hutchinson, Orchard Park, NY (US); Marc Farfaglia, Buffalo, NY (US); Cassidy Grant, Buffalo, NY (US); Matthew J. Noble, Lancaster, NY (US)

(73) Assignee: PostProcess Technologies, Inc., Buffalo, NY (US)

( * ) Notice: Subject to any disclaimer, the term of this patent is extended or adjusted under 35 U.S.C. 154(b) by 16 days.

(21) Appl. No.: 17/256,194

(22) PCT Filed: Jun. 26, 2019

(86) PCT No.: PCT/US2019/039338
§ 371 (c)(1),
(2) Date: Dec. 26, 2020

(87) PCT Pub. No.: WO2020/006141
PCT Pub. Date: Jan. 2, 2020

(65) Prior Publication Data
US 2021/0269658 A1    Sep. 2, 2021

Related U.S. Application Data

(60) Provisional application No. 62/690,285, filed on Jun. 26, 2018.

(51) Int. Cl.
*B08B 3/10* (2006.01)
*C09D 9/02* (2006.01)
(Continued)

(52) U.S. Cl.
CPC ............... *C09D 9/02* (2013.01); *B08B 3/10* (2013.01); *B29C 64/35* (2017.08); *B33Y 40/20* (2020.01)

(58) Field of Classification Search
CPC .......... B29C 64/35; B33Y 40/20; B08B 3/10; C09D 9/02
See application file for complete search history.

(56) References Cited

U.S. PATENT DOCUMENTS

| 10,737,440 B2 | 8/2020 | Hutchinson |
| 10,850,449 B2 | 12/2020 | Hutchinson et al. |

(Continued)

FOREIGN PATENT DOCUMENTS

| DE | 102009061069 A1 * | 6/2011 | ......... B29C 67/0059 |
| DE | 102009047237 A1 * | 8/2011 | ............ B08B 3/104 |

(Continued)

OTHER PUBLICATIONS

WIPO, International Search Report for PCT/US2019/039338, dated Nov. 8, 2019.

*Primary Examiner* — Sharidan Carrillo
(74) *Attorney, Agent, or Firm* — Hodgson Russ LLP

(57) ABSTRACT

Described are finishing solutions for removing support material and finishing 3D-printed objects. The finishing solution may contain a base (e.g., an aqueous base), an optional first caustic agent, an optional second caustic agent, an optional third caustic agent, an optional emulsifier, a polyol, a first antifoaming agent, an optional second antifoaming agent, and water. Also described are methods of using the finishing solution described herein.

6 Claims, 10 Drawing Sheets

(51) Int. Cl.
*B29C 64/35* (2017.01)
*B33Y 40/20* (2020.01)

(56) References Cited

U.S. PATENT DOCUMENTS

| | | | |
|---|---|---|---|
| 11,110,661 | B2 | 9/2021 | Hutchinson |
| 2006/0258555 | A1 | 11/2006 | Filippini et al. |
| 2013/0330927 | A1 * | 12/2013 | Kumagai .......... H01L 21/02063 510/176 |
| 2018/0291219 | A1 * | 10/2018 | Kiyosada ............. C09D 11/106 |
| 2019/0022931 | A1 | 1/2019 | Hutchinson |
| 2019/0176403 | A1 | 6/2019 | Hutchinson |
| 2019/0270248 | A1 | 9/2019 | Hutchinson |
| 2019/0322898 | A1 | 10/2019 | Hutchinson et al. |
| 2020/0109357 | A1 * | 4/2020 | Jahns ....................... B08B 3/08 |

FOREIGN PATENT DOCUMENTS

| | | | | |
|---|---|---|---|---|
| DE | 102009047237 | A1 | 8/2011 | |
| JP | S6295365 | A | 5/1987 | |
| WO | 2003101753 | A2 | 12/2003 | |
| WO | 2019203852 | A1 | 10/2019 | |
| WO | WO-2019203855 | A1 * | 10/2019 | |
| WO | WO-2019204822 | A1 * | 10/2019 | ............. B24C 1/083 |

* cited by examiner

COMPOSITIONS FOR REMOVING SUPPORT MATERIAL FROM A 3D-PRINTED OBJECT AND METHODS OF MAKING THEREOF

CROSS REFERENCE TO RELATED APPLICATIONS

This application claims benefit to U.S. Provisional Application No. 62/690,285 filed on Jun. 26, 2018, the disclosure of which is hereby incorporated by reference.

FIELD OF THE DISCLOSURE

This disclosure relates generally to fluidic solutions and methods for removing undesired support material from an object made by additive manufacturing techniques such as 3D printing. Such fluidic solutions may be sprayed at the object.

BACKGROUND OF THE DISCLOSURE 3D-printing is a process by which a computer controlled device (e.g., a printer) creates an object by sequentially applying material. That is, an object is "printed," for example, using an inkjet printer head that additively deposits material in such a way that the object is created (printed) from a starting platform (a "printing tray" or a "build tray"). Often, additive manufacturing methods, including 3D-printing, that are commonly used require additional material ("support material") to be printed for the purpose of supporting portions of the object during printing. This support material buttresses the object to prevent issues like sagging. Eventually, it may be desirable to remove some or all of the support material, for example, after printing is complete. In addition, 3D-printed objects can have rough, unfinished surfaces. These surfaces may show the build lines, which are indicative of the manner in which material was printed during the additive manufacturing process. As used herein, unless otherwise indicated, the term "finishing" refers to removing undesirable material from a 3D-printed object so as to produce a finished object. Finishing can include one or more processes, including, but not limited to, removing undesirable metal powder, removing undesirable print material, removing undesirable support material and/or making rough surfaces smoother. Sometimes, in the 3D-printing industry, finishing may be referred to as "cleaning."

The support material can have a complex geometry and can also be extensive because it may support the object at a plurality of locations. Additionally, because additive manufacturing prints an object in discrete layers, the surface finish of a 3D-printed object is often rough because edges of the layers do not always align with each other, thus creating a rough, bumpy outer surface. This outer surface is not only unappealing from a visual standpoint, but also can create stress concentrations, which could result in cracks during testing or use of the object and thus lead to a premature failure.

To remove support material from rough surfaces, and to remove other undesirable material, chemicals may be applied to the object. These chemicals may be in the form of a liquid solution. Some finishing solutions are organic based and contain isopropanol (IPA), which has a low flash point, making it dangerous to work with. There is a need for a finishing solution that is primarily aqueous, and thus less toxic and less flammable.

SUMMARY OF THE DISCLOSURE

A finishing solution that is in keeping with the invention may be used to remove undesired material from an additively manufactured object. The finishing solution may comprise a base (e.g., an aqueous base), an optional first caustic agent, an optional second caustic agent, an optional third caustic agent, an optional emulsifier, a polyol, a first antifoaming agent, an optional second antifoaming agent, and water. In a particular example of the invention, a finishing solution that is in keeping with the invention may comprise a base, an optional filler, an optional first caustic agent, an optional second caustic agent, an optional emulsifier, a first antifoaming agent, an optional second antifoaming agent, a polyol, and water. The finishing solution may have a basic pH. In some embodiments, the pH is greater than 7. In other embodiments of the invention, the pH is 10 or greater.

A finishing solution that is in keeping with the invention comprises:
0.0002-20% by weight a base;
optionally, 0.0005-2.5% by weight a first caustic agent;
optionally, 0.0005-2.5% by weight a second caustic agent;
optionally, 0.0005-5.0% by weight a third caustic agent;
optionally, 0.0005-5.0% by weight an emulsifier;
optionally, up to 1% by weight a filler;
0.35-49.5% by weight a polyol;
0.005-15% by weight a first antifoaming agent;
optionally, 0.005-15% by weight a second antifoaming agent; and
water,
where the finishing solution has a pH of 11 or above. A particular example of such a finishing solution may comprise:
0.0002-6% by weight a base;
up to 1% by weight the filler;
up to 1% by weight the first caustic agent;
0.001-2% by weight the first antifoaming agent;
0.001-2% by weight the polyol;
0.0005-1% by weight the emulsifier; and
water,
where the finishing solution has a pH of 11 or above.

The base may comprise an aqueous solution, where the solution is 1 to 50% by weight a base. The base may be chosen from lithium hydroxide, sodium hydroxide, potassium hydroxide, rubidium hydroxide, cesium hydroxide, magnesium hydroxide, calcium hydroxide, strontium hydroxide, barium hydroxide, and the like, and combinations thereof.

Sodium sulfate may be used as a filler in a finishing solution that is in keeping with the invention.

The first caustic agent and second caustic agent may be chosen from potassium bicarbonate, sodium bicarbonate, potassium carbonate, sodium carbonate, aluminum phosphate, calcium phosphate, dicalcium phosphate, magnesium phosphate, monopotassium phosphate, dipotassium phosphate, tripotassium phosphate, potassium phosphate, sodium phosphate, disodium phosphate, trisodium phosphate, sodium aluminum phosphate, sodium potassium phosphate, calcium potassium phosphate, calcium sodium phosphate, and the like, and combinations thereof. The first caustic agent and the second caustic agent may be a conjugate acid/base pair, such as potassium/sodium carbonate and the second caustic agent is potassium/sodium bicarbonate. The third caustic agent may be sodium silicate or sodium metasilicate.

The first antifoaming agent and second antifoaming agent may be chosen from Foam Ban® 136B, Foam Ban® 149, Foam Ban® 152, Foam Ban® 155, Foam Ban® 157, Foam Ban® 159, Foam Ban® 169, Foam Ban® 182, Foam Ban® 225D, Foam Ban® 260D, Foam Ban® 2642, Foam Ban® 2901, Foam Ban® 3505, Foam Ban® 3529B, Foam Ban® 3555, Foam Ban® 3588G, Foam Ban® 3633E, Foam Ban® 3744, Foam Ban® 3806, Foam Ban® 625, Foam Ban® C277, Foam Ban® CL-100E, Foam Ban® CL-125E, Foam Ban® CL-150D, Foam Ban® HP705, Foam Ban® HP710, Foam Ban® HP720, Foam Ban® HP730, Foam Ban® HP732, Foam Ban® HP738, Foam Ban® HP740, Foam Ban® HP753, Foam Ban® HP777, Foam Ban® HV-810G, Foam Ban® HV-820G, Foam Ban® HV-821, Foam Ban® HV-825G, Foam Ban® HV-860, Foam Ban® MS-293, Foam Ban® MS-30, Foam Ban® MS-455N, Foam Ban® MS-525, Foam Ban® MS-550, Foam Ban® MS-575, Foam Ban® MS-5A, Foam Ban® MS-909B, Foam Ban® SB-1, Foam Ban® SB-21, Foam Ban® SB-73, Foam Ban® SB-8, Foam Ban® SB-81, Foam Ban® SB-88, Foam Ban® TK-100, Foam Ban® TK-150, Foam Ban® TK-200, Foam Ban® TK-201, Foam Ban® TK-75, Foam Ban® TS-3618, Foam Ban® TS-7250, Foam Ban® XRM-3599B, Trans 30, and the like, and combinations thereof.

The polyol may be chosen from ethylene glycol, propylene glycol, methoxytriglycol, ethoxytriglycol, butoxytriglycol, diethylene glycol n-butyl 30 ether acetate, diethylene glycol monobutyl ether, ethylene glycol n-butyl ether acetate, ethylene glycol monobutyl ether, diethylene glycol monoethyl ether, DOWANOL™ DPH 255, ethylene glycol phenyl ether, diethylene glycol monohexyl ether, ethylene glycol monohexyl ether, diethylene glycol monomethyl ether, ethylene glycol monopropyl ether, di(propylene glycol) methyl ether, dipropylene glycol methyl ether acetate, dipropylene glycol n-butyl ether, propylene glycol diacetate, propylene glycol methyl ether, propylene glycol monomethyl ether acetate, propylene glycol n-butyl ether, propylene glycol phenyl ether, tripropylene glycol methyl ether, tripropylene glycol n-butyl ether, dipropylene glycol dimethyl ether, 2-butoxyethanol, and the like, and combinations thereof.

The emulsifier may be chosen from polysorbates, soaps, fatty acid sulfonates, ethoxylated compounds, such as ethoxylated propylene glycol, lecithin, polygluconates, quaternary ammonium fatty acid adducts, lignin sulfonates, sodium dodecyl sulfate, lauryl dimethyl amine oxide, cetyltrimethylammonium bromide (CTAB), polyethoxylated alcohols, polyoxyethylene sorbitan, Octoxynol, bile salts (sodium deoxycholate, sodium cholate), polyoxyl castor oil, cyclodextrins, sodium caprylate, polysorbate 20, polysorbate 40, polysorbate 60, polysorbate 80, and the like, and combinations thereof.

A finishing solution that is in keeping with the invention may comprise:
  a base, where the base is aqueous potassium hydroxide having 45% by weight potassium hydroxide;
  a filler, where the filler is sodium sulfate;
  a first caustic agent, where the first caustic agent is sodium bicarbonate;
  a second caustic agent, where the second caustic agent is potassium carbonate;
  a first antifoaming agent, where the first antifoaming agent is Foam Ban® 753N;
  a second antifoaming agent, where the second antifoaming agent is Trans 30;
  a polyol, where the polyol is propylene glycol; and
  an emulsifier, where the emulsifier is polysorbate 80.

A finishing solution that is in keeping with the invention may comprise:
  the base is 45% by weight aqueous potassium hydroxide;
  the first caustic agent is potassium carbonate;
  the second caustic agent is trisodium phosphate;
  the third caustic agent is sodium metasilicate;
  the polyol is propylene glycol;
  the emulsifier is Polysorbate 80;
  the first antifoaming agent is Trans 30; and
  the second antifoaming agent is Foam Ban® 753N.

A finishing solution that is in keeping with the invention may be formed by mixing a Component A, a Component B, and water, such that the total volume percent of Component A and Component B combined does not exceed 20% by volume. Component A may comprise: the aqueous base, the filler, the first caustic agent, the second caustic agent, water; and where Component A has a pH of 13 or above. Component B may comprise: the first antifoaming agent, the second antifoaming agent, the polyol, the emulsifier, and water.

In an example of such a finishing solution comprises:
  0.1-19.9% by volume Component A, where Component A comprises:
    20-60% by weight the aqueous base,
    up to 5% by weight the filler,
    up to 5% by weight the first caustic agent,
    up to 5% by weight the second caustic agent, and
    water;
  0.1-19.9% by volume Component B; where Component B comprises:
    up to 10% by weight the first antifoaming agent,
    up to 10% by weight the second antifoaming agent,
    1-10% by weight the polyol, 0.5-5% by weight the emulsifier, and water.

In a more a specific example, the finishing solution comprises:
  4%±0.5% by volume Component A, where Component A includes:
    50% by weight aqueous potassium hydroxide having 45% by weight potassium hydroxide,
    1% by weight sodium sulfate,
    0.1% by weight sodium bicarbonate,
    0.1% by weight potassium carbonate, and
    48.8% by weight water; and
  4%±0.5% by volume Component B, where Component B includes:
    2.5% by weight Foam Ban® 753N,
    2.5% by weight Trans 30,
    2.5% by weight propylene glycol,
    1% by weight polysorbate 80, and
    91.5% by weight water.

A finishing solution that is in keeping with the invention may be formed by mixing a Component A, a Component B, and water, such that the total volume percent of Component A and Component B combined does not exceed 20% by volume, where Component A comprises:
  the aqueous base,
  the filler,
  the first caustic agent,
  the second caustic agent,
  the third caustic agent, and
  water; and Component B comprises:
  the polyol,
  the emulsifier;

the first antifoaming agent,
the second antifoaming agent, and
water.

In a particular example, such a finishing solution may comprise:
0.1-19.9% volume Component A, where Component A comprises:
20-60% by weight the aqueous base,
0.05-10.0% by weight the first caustic agent,
0.05-10.0% by weight the second caustic agent,
0.05-10.% by weight the third caustic agent, and
water;
0.1-19.9% volume Component B; where Component B comprises:
0.05-5.0% by weight the polyol,
0.05-5.0% by weight the emulsifier,
0.05-5.0% by weight the first antifoaming agent,
0.05-5.0% by weight the second antifoaming agent, and
water.

In a more specific example, the finishing solution may comprise:
4%±0.5% by volume Component A, where Component A comprises:
50% by weight 45% by weight aqueous KOH,
8.0% by weight sodium metasilicate,
4.0% by weight trisodium phosphate,
3.0% by weight potassium carbonate, and
the remainder is water; and
1%±0.5% by volume Component B, where Component B comprises:
2.50% propylene glycol,
2.50% Foam Ban® 753 N,
2.50% Trans 30,
1.00% Polysorbate 80, and
the remainder is water.

A method of removing support material may comprise: i) applying a finishing solution of the present invention in order to remove support material from the object or a portion thereof (e.g., by soaking spraying the object or by soaking the object); and ii) removing the finishing solution from the object. The support material may have resulted from a Polyjet printing process or a fused deposition modeling (FDM) process. The method may further comprise heating the finishing solution, where the finishing solution is heated to a temperature of 115 to 150° F., including all 0.01° F. values and ranges therebetween and where applying the finishing solution includes raising the pressure of the finishing solution to a pressure of 1-40 psi.

A method of the present invention may comprise using a finishing solution formed by mixing a Component A of the present invention, a Component B of the present invention, and water.

A method of the present invention may be used to remove undesirable material chosen from SR20, SR30, SR35, SR100, SR110, and the like, and combinations thereof or SUP705, SUP706, SUP708, and the like, and combinations thereof.

BRIEF DESCRIPTION OF THE FIGURES

For a fuller understanding of the nature and objects of the invention, reference should be made to the following detailed description taken in conjunction with the accompanying figures.

FIG. 1A shows the object resting on a metal mesh prior to finishing. FIG. 1B shows the object prior to finishing. FIG. 1C shows the object after 120 minutes of finishing using a finishing solution that is in keeping with the invention. FIG. 1D shows the object after 180 minutes of finishing using a finishing solution that is in keeping with the invention. FIG. 1E shows the object after 240 minutes of finishing using a finishing solution that is in keeping with the invention.

FIG. 1A shows the top of the object prior to finishing. FIG. 1B shows the bottom of the object prior to finishing. FIG. 2C shows the top of the object after 120 minutes of finishing using a finishing solution that is in keeping with the invention. FIG. 2D shows the bottom of the object after 120 minutes of finishing using a finishing solution that is in keeping with the invention. FIG. 2E shows the top of the object oriented in a different position after 120 minutes of finishing using a finishing solution that is in keeping with the invention.

DETAILED DESCRIPTION OF THE DISCLOSURE

Figure 1A:
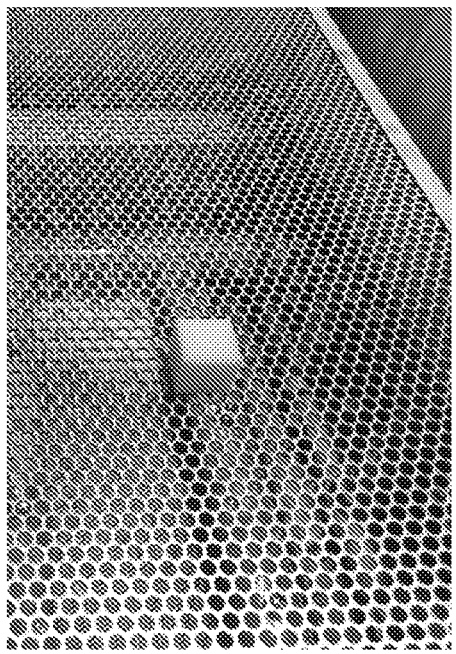
FIGS. 1A-1E are photos of an object (a cube) that was made by fused deposition modeling ("FDM").
Figure 1B:
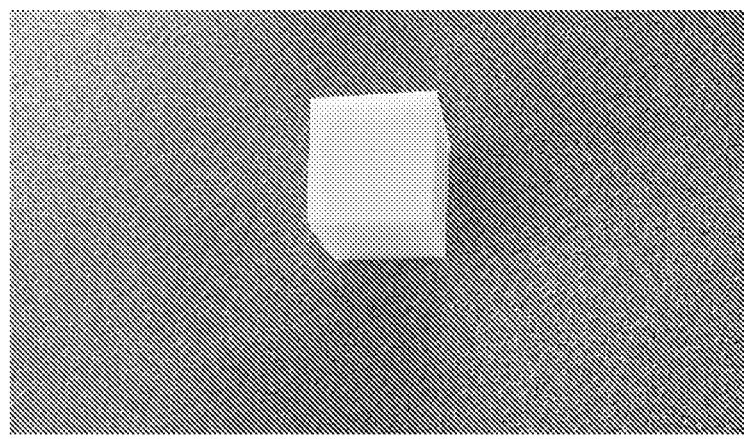
Figure 1C:
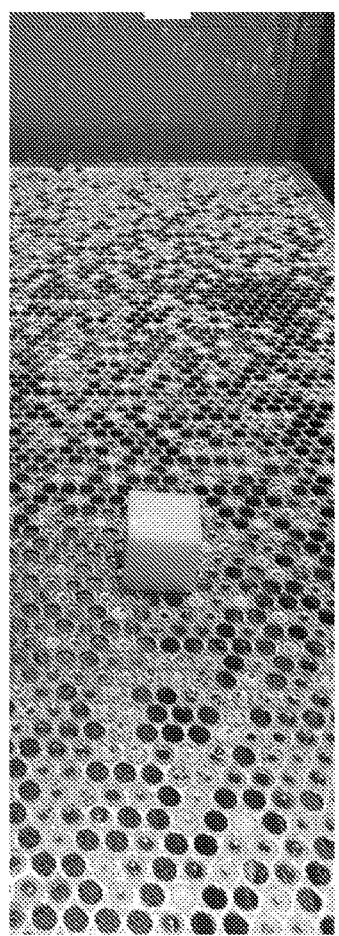
Figure 1D:
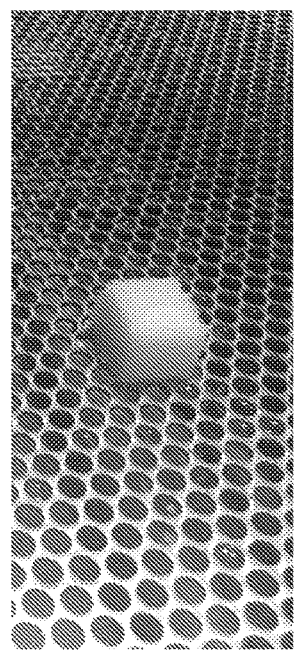
Figure 1E:
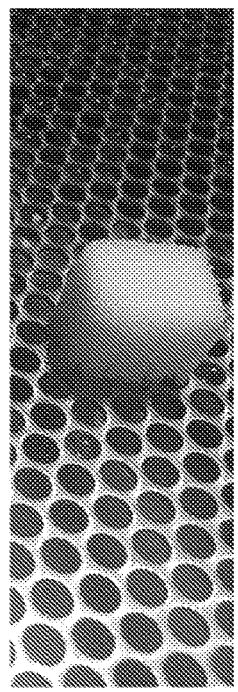
Figure 1F:
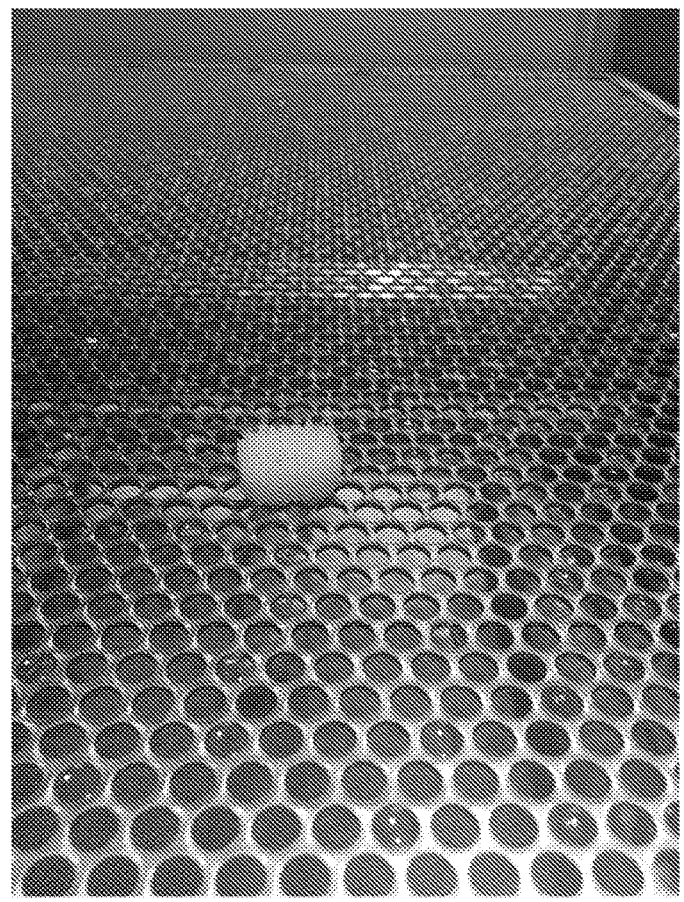
FIG. 1F shows the object after 300 minutes of finishing using a finishing solution that is in keeping with the invention.

Although the invention will be described in terms of certain examples, other examples, including examples that do not provide all of the benefits and features set forth herein, are also within the scope of the invention. Various changes to the composition of the finishing solution and/or method of finishing a 3D-printed object may be made without departing from the scope of the invention.

Ranges of values are disclosed herein. The ranges set out a lower limit value ("LLV") and an upper limit value ("ULV"). Unless specified otherwise, the LLV, ULV, and all values between the LLV and ULV are part of the range.

The present disclosure describes finishing solutions for removing undesirable material from an FDM and/or Polyjet 3D-printed object. Undesirable material of an unfinished object is dissolved by a finishing solution that is in keeping with the invention, and in doing so provides a finished object.

As used herein, unless otherwise indicated, the term "support material" refers to material that is operatively arranged to support portions of an object during an additive manufacturing process, but which are undesired once the manufacturing process is complete. Support material can comprise the same material as the object that is being manufactured, or can be made of a different material. Materials that can be removed during finishing include, but are not limited to, materials used during Polyjet 3D printing (e.g., SUP705, SUP706, SUP707, SUP708, and combinations thereof) and/or FDM 3D printing (e.g., SR20, SR30, SR35, SR100, SR110, and combinations thereof).

Some finishing processes are mechanical in nature (e.g., abrasion techniques, such as sanding), and others are a combination of mechanical processes and chemical processes. Chemical finishing solutions may be caustic. In a conventional machine that uses chemical finishing solutions to remove undesirable material (e.g., undesirable support material), an unfinished 3D-printed object may be subjected to a process to remove undesirable material, and thereby provide a finished object. In one such process, the unfinished object is placed (e.g., partially or completely submerged) in a tank that contains (e.g., at least partially filled) a liquid finishing solution. While in the finishing solution, the object may be subjected to mechanical agitation, abrasion, and/or heating in order to remove undesirable material from the object. Mechanical agitation may occur by moving the liquid finishing solution (e.g., via a pump) and/or by using ultrasound. In other such processes, the object is subjected to a liquid spray. In those processes, the object is placed in a chamber, and a pump is used to force the liquid finishing solution through one or more nozzles, which both applies the finishing solution to the object and mechanically agitates the object. In such processes, the liquid may include chemical solvents to dissolve support material, and thereby create a finished or nearly finished form of the object. Heat from a heat source may be used to maintain the finishing solution at a desired temperature. The support material may be removed thermally, chemically, mechanically, or via a combination of two or more of these general processes.

A finishing solution that is in keeping with the invention may be used to remove undesirable material. The finishing solution may comprise a base (e.g., an aqueous base), an optional first caustic agent, an optional second caustic agent, an optional third caustic agent, an optional emulsifier, a polyol, a first antifoaming agent, an optional second antifoaming agent, and water. In a particular example, a finishing solution that is in keeping with the invention may comprise a base, an optional filler, an optional first caustic agent, an optional second caustic agent, an optional emulsifier, a first antifoaming agent, an optional second antifoaming agent, a polyol, and water. The finishing solution may have a basic pH.

In various examples, the basic pH is greater than 7. In various other examples, the basic pH is 10 or greater.

A finishing solution that is in keeping with the invention may be a finishing solution for removing undesirable material. The finishing solution may comprise:
(a) 0.0002-20% by weight a base, including all 0.0001% values and ranges therebetween;
(b) optionally, up to 1% by weight a filler, including all 0.0001% values and ranges therebetween;
(c) optionally, 0.0005-2.5% by weight a first caustic agent, including all 0.0001% values and ranges therebetween;
(d) optionally, 0.0005-2.5% by weight a second caustic agent, including all 0.0001% values and ranges therebetween;
(e) optionally, 0.0005-2.5% by weight a third caustic agent, including all 0.0001% values and ranges therebetween;
(f) 0.005-15% by weight a first antifoaming agent, including all 0.0001% values and ranges therebetween;
(g) optionally, 0.005-15% by weight a second antifoaming agent, including all 0.0001% values and ranges therebetween;
(h) 0.35-49.5% by weight a polyol, including all 0.0001% values and ranges therebetween;
(i) 0.0005-5% by weight an emulsifier, including all 0.0001% values and ranges therebetween; and
(j) water (e.g., the remainder of this finishing solution may be water).

In a particular example, a finishing solution that is in keeping with the invention may be a finishing solution for removing undesirable material. The finishing solution may comprise:
(a) 0.0002-6% by weight a base, including all 0.0001% values and ranges therebetween;
(b) optionally, up to 1% by weight a filler, including all 0.0001% values and ranges therebetween;
(c) optionally, up to 1% by weight a first caustic agent, including all 0.0001% values and ranges therebetween;
(d) optionally, up to 1% by weight a second caustic agent, including all 0.0001% values and ranges therebetween;
(e) 0.001-2% by weight a first antifoaming agent, including all 0.0001% values and ranges therebetween;
(f) optionally, up to 2% by weight a second antifoaming agent, including all 0.0001% values and ranges therebetween;
(g) 0.001-2% by weight a polyol, including all 0.0001% values and ranges therebetween; (f) 0.0005-1% by weight an emulsifier, including all 0.0001% values and ranges therebetween; and
(g) water (e.g., the remainder of this finishing solution may be water).

A finishing solution that is in keeping with the invention may be a single solution (e.g., a premixed solution), or, alternatively, may be formed by a combination of solutions (e.g., neat or diluted with water) that are mixed together to provide the finishing solution.

A finishing solution that is in keeping with the invention may be used to remove undesirable material from a 3D-printed object. The finishing solution may comprise:
0.1-19.9% by volume Component A, including all 0.01% values and ranges therebetween;
0.1-19.9% by volume Component B, including all 0.01% values and ranges therebetween; and
water (e.g., the remainder of this finishing solution may be water), where the combination of Component A and B does not exceed 20% by volume.

Component A may comprise:
(a) an aqueous base;
(b) a filler;
(c) a first caustic agent;
(d) a second caustic agent; and
(e) water (e.g., the remainder of Component A may be water).

Component B may comprise:
(a) a first antifoaming agent;
(b) a second antifoaming agent;
(c) a polyol;
(d) an emulsifier; and
(e) water (e.g., the remainder of Component B may be water).

The remainder of the finishing solution may be water.

A finishing solution that is in keeping with the invention may comprise:
(a) 0.1-19.9% by volume Component A, including all 0.1% values and ranges therebetween;
(b) 0.1-19% by volume Component B, including all 0.1% values and ranges therebetween; and
(c) water (e.g., the remainder of this finishing solution may be water), where the total percent by volume of Component A and Component B does not exceed 20%.

Component A may be:
(a) an aqueous base;
(b) a first caustic agent;
(c) a second caustic agent;
(d) a third caustic agent;

(e) water (e.g., the remainder of Component A may be water).

Component B may be:
(a) a first antifoaming agent;
(b) a second antifoaming agent;
(c) a polyol;
(d) an emulsifier; and
(e) water (e.g., the remainder of Component B may be water).

The remainder of the finishing solution may be water.

A finishing solution that is in keeping with the invention may be used to remove undesirable material from a 3D-printed object. The finishing solution may comprise:
0.1-19.9% by volume Component A, including all 0.01% values and ranges therebetween;
0.1-19.9% by volume Component B, including all 0.01% values and ranges therebetween; and
water (e.g., the remainder of this finishing solution may be water), where the combination of Component A and B does not exceed 20% by volume.

Component A may comprise:
(a) 20-60% by weight an aqueous base, including all 0.1% values and ranges therebetween, where the aqueous base is 1-50% by weight a base (e.g., KOH)
(b) optionally, up to 5% by weight a filler, including all 0.1% values and ranges therebetween;
(c) optionally, up to 5% by weight a first caustic agent, including all 0.1% values and ranges therebetween;
(d) optionally, up to 5% by weight a second caustic agent, including all 0.1% values and ranges therebetween; and
(e) water (e.g., the remainder of Component A may be water).

Component B may comprise:
(a) 1-10% by weight a first antifoaming agent, including all 0.1% values and ranges therebetween;
(b) optionally, up to 10% by weight a second antifoaming agent, including all 0.1% values and ranges therebetween;
(c) 1-10% by weight a polyol, including all 0.1% values and ranges therebetween;
(d) 0.5-5% by weight an emulsifier, including all 0.01% values and ranges therebetween; and
(e) water (e.g., the remainder of Component B may be water).

The remainder of the finishing solution is water.

Alternatively, a finishing solution that is in keeping with the invention may comprise:
(a) 1-99% by volume Component A; and
(b) the remainder is Component B.

A finishing solution that is in keeping with the invention may be able to finish (e.g., remove support material) 3D-printed objects produced, for example, through Polyjet techniques, FDM techniques, or a combination thereof. Without intending to be bound to any particular theory, it is expected that different amounts of Component A and Component B affect the ability of the finishing solution to finish different types of materials. For example, using a mixture comprising 4% by volume Component A, 4% by volume Component B, and 92% by volume water may be used to effectively finish an object produced through FDM techniques.

The base may be used to provide a desired pH (e.g., a pH of 10 or greater) of the finishing solution. A finishing solution that is in keeping with the invention may be made by adding a base or an aqueous base to the other components and/or elements of the finishing solution. An aqueous base comprises water and a base. Non-limiting examples of suitable bases (e.g., for use in an aqueous base) include hydroxide bases, such as LiOH, NaOH, KOH, RbOH, CsOH, $Mg(OH)_2$, $Ca(OH)_2$, $Sr(OH)_2$, $Ba(OH)_2$, and the like, and combinations thereof. A base suitable for the invention may be 1-50% by weight in water. In a particular example, the base is provided via an aqueous solution that is 45% by weight a base (e.g., such as a potassium hydroxide solution (45 wt. % KOH in $H_2O$) sold by Sigma Aldrich). When mixed with the components to form a finishing solution that is in keeping with the invention, the base may constitute 0.0002-6% by weight of the finishing solution, including all 0.0001% values and ranges therebetween, relative to the total weight of the finishing solution.

A filler may be present in the finishing solution. Fillers are inexpensive components which have little or no impact on the function of the finishing solution, except to provide sufficient volume, for example, to fill a tank in a machine that is configured for finishing a 3D-printed object. Fillers may be, but are not limited to, sodium salts and sulfate salts. As an example, the filler may be sodium sulfate. For example, a filler may constitute up to 1%, including all 0.0001% values and ranges therebetween, of the total weight of the finishing solution.

A first caustic agent may be present in a finishing solution that is in keeping with the invention. The first caustic agent may be used to provide a desired pH (e.g., a pH of 10 or greater) of the finishing solution. Examples of a first caustic agent include, but are not limited to, potassium bicarbonate, sodium bicarbonate, potassium carbonate, sodium carbonate, and the like. For example, the first caustic agent may constitute up to 1%, including all 0.0001% values and ranges therebetween, of the total weight of the finishing solution.

A second caustic agent may optionally be present in a finishing solution that is in keeping with the invention. The second caustic agent may be used to provide a desired pH (e.g., a pH of 10 or greater) of the finishing solution. Examples of a second caustic agent include, but are not limited to, potassium bicarbonate, sodium bicarbonate, potassium carbonate, sodium carbonate, aluminum phosphate, dicalcium phosphate, tricalcium phosphate, magnesium phosphate, potassium phosphate, dipotassium phosphate, tripotassium phosphate, sodium phosphate, disodium phosphate, trisodium phosphate, sodium aluminum phosphate, sodium potassium phosphate, calcium potassium phosphate, calcium sodium phosphate, and the like. If there are first and second caustic agents, then the first and second caustic agents may optionally be conjugate acids/bases of each other (e.g., $HCO_3^-$ and $CO_3^{2-}$). For example, the second caustic agent may constitute up to 1%, including all 0.0001% values and ranges therebetween, of the total weight of the finishing solution.

A third caustic agent may optionally be present in a finishing solution that is in keeping with the invention. The third caustic agent may be used to provide a desired pH (e.g., a pH of 10 or greater) of the finishing solution. Examples of a third caustic agent include, but are not limited to, all ratios and formulations of sodium silicate or sodium metasilicate (e.g., combinations of sodium oxide, $Na_2O$, $SiO_2$, and the like), also known as waterglass or liquid glass, where the various grades of sodium silicate are characterized by their $SiO_2:Na_2O$ weight ratio.

A polyol can be present in a finishing solution of the present invention, and that polyol may aid in dissolving organic materials and the like found in resins and support materials frequently used in Polyjet and/or FDM printing techniques. Polyols may be glycols or glycol ethers. Non-limiting examples of polyols include ethylene glycol, propylene glycol, glycerol, methoxytriglycol, ethoxytriglycol, butoxytriglycol, diethylene glycol n-butyl ether acetate, diethylene glycol monobutyl ether, ethylene glycol n-butyl ether acetate, ethylene glycol monobutyl ether, diethylene glycol monoethyl ether, DOWANOL™ DPH 255, ethylene glycol phenyl ether, diethylene glycol monohexyl ether, ethylene glycol monohexyl ether, diethylene glycol monomethyl ether, ethylene glycol monopropyl ether, di(propylene glycol) methyl ether, dipropylene glycol methyl ether acetate, dipropylene glycol n-butyl ether, propylene glycol diacetate, dipropylene glycol methyl ether, propylene glycol monomethyl ether acetate, propylene glycol n-butyl ether, propylene glycol phenyl ether, tripropylene glycol methyl ether, tripropylene glycol n-butyl ether, dipropylene glycol dimethyl ether, 2-butoxyethanol, and the like, and combinations thereof. For example, the polyol may constitute 0.001-2%, including all 0.0001% values and ranges therebetween, of the total weight of the finishing solution.

A finishing solution according to the invention may include at least one antifoaming agent (also referred to as a "defoamer" or "defoaming agent"). Such an antifoaming agent (e.g., at least one antifoaming agent) may be used to reduce foaming of the finishing solution. For example, an antifoaming agent can be a substance comprising silicone and/or synthetic hydrocarbons. Suitable examples of antifoaming agents include, but are not limited to, Foam Ban® 136B, Foam Ban® 149, Foam Ban® 152, Foam Ban® 155, Foam Ban® 157, Foam Ban® 159, Foam Ban® 169, Foam Ban® 182, Foam Ban® 225D, Foam Ban® 260D, Foam Ban® 2642, Foam Ban® 2901, Foam Ban® 3505, Foam Ban® 3529B, Foam Ban® 3555, Foam Ban® 3588G, Foam Ban® 3633E, Foam Ban® 3744, Foam Ban® 3806, Foam Ban® 625, Foam Ban® C277, Foam Ban® CL-100E, Foam Ban® CL-125E, Foam Ban® CL-150D, Foam Ban® HP705, Foam Ban® HP710, Foam Ban® HP720, Foam Ban® HP730, Foam Ban® HP732, Foam Ban® HP738, Foam Ban® HP740, Foam Ban® HP753, Foam Ban® HP777, Foam Ban® HV-810G, Foam Ban® HV-820G, Foam Ban® HV-821, Foam Ban® HV-825G, Foam Ban® HV-860, Foam Ban® MS-293, Foam Ban® MS-30, Foam Ban® MS-455N, Foam Ban® MS-525, Foam Ban® MS-550, Foam Ban® MS-575, Foam Ban® MS-5A, Foam Ban® MS-909B, Foam Ban® SB-1, Foam Ban® SB-21, Foam Ban® SB-73, Foam Ban® SB-8, Foam Ban® SB-81, Foam Ban® SB-88, Foam Ban® TK-100, Foam Ban® TK-150, Foam Ban® TK-200, Foam Ban® TK-201, Foam Ban® TK-75, Foam Ban® TS-3618, Foam Ban® TS-7250, Foam Ban® XRM-3599B, Trans 30, and the like, and combinations thereof. For example, a finishing solution that is in keeping with the invention may be 0.001-2% by weight a first antifoaming agent, including all 0.0001% values and ranges therebetween, relative to the total weight of the finishing solution, and up to 2% by weight a second antifoaming agent, including all 0.0001% values and ranges therebetween, relative to the total weight of the finishing solution. In an example, a finishing solution that is in keeping with the invention may be 0.01-2% by weight a first antifoaming agent, including all 0.001% values and ranges therebetween, relative to the total weight of the finishing solution, and no second antifoaming agent is used.

The finishing solution may include an emulsifier in order to aid in sustaining the length of time before such a finishing solution separates into organic and aqueous layers. The emulsifier may be referred to as a surfactant. Examples of surfactants/emulsifiers include, but are not limited to, polysorbates (e.g., polysorbate 20, polysorbate 40, polysorbate 60, and polysorbate 80), sodium caprylate, soaps (free fatty acid salts), fatty acid sulfonates (e.g., sodium lauryl sulfate (SLS)), ethoxylated compounds (e.g., ethoxylated propylene glycol), lecithin, polygluconates (e.g. short-chain starches), quaternary ammonium fatty acid adducts (e.g., ammonium quaternary frequently used as fabric softeners), lignin sulfonates, lauryl dimethyl amine oxide, cetyltrimethylammonium bromide (CTAB), polyethoxylated alcohols, polyoxyethylene sorbitan, octoxynol, bile salts (e.g., sodium deoxycholate, sodium cholate, and the like), polyoxyl castor oil, cyclodextrins, and the like, and combinations thereof. The emulsifier may constitute 0.0005-1%, including all 0.0001% values and ranges therebetween, of the total weight of the finishing solution.

A particular example of a finishing solution that is in keeping with the invention comprises:
 (a) 0.1-19.9% by volume Component A, including all 0.1% values and ranges therebetween;
 (b) 0.1-19.9% by volume Component B, including all 0.1% values and ranges therebetween; and
 (c) water (e.g., the remainder of this finishing solution may be water), where the total percent by volume of Component A and Component B does not exceed 20%.
Component A may be:
 (a) 20-60% by weight, including all 0.1% values and ranges therebetween, an aqueous base that is 45% by weight KOH;
 (b) optionally, up to 5% by weight sodium sulfate, including all 0.1% values and ranges therebetween;
 (c) optionally, up to 5% by weight sodium bicarbonate, including all 0.1% values and ranges therebetween;
 (d) optionally, up to 5% by weight potassium carbonate, including all 0.1% values and ranges therebetween; and
 (e) water (e.g., the remainder of Component A may be water).
Component B may be:
 (a) optionally, up to 10% by weight Foam Ban® 753N, including all 0.1% values and ranges therebetween;
 (b) optionally, up to 10% by weight Trans 30, including all 0.1% values and ranges therebetween;
 (c) 1-10% by weight propylene glycol, including all 0.1% values and ranges therebetween;
 (d) 0.5-5% by weight polysorbate 80, including all 0.1% values and ranges therebetween; and
 (e) water (e.g., the remainder of Component B may be water),
where at least one of Foam Ban® 753N and Trans 30 is included in Component B. In such an example, it is expected that the finishing solution is desirable for finishing (e.g., remove support material) Polyjet 3D-printed objects and/or FDM 3D-printed objects.

In a particular example, a finishing solution for use (e.g., to remove undesirable material) on a Polyjet 3D-printed object and/or an FDM 3D-printed object has:
 (a) 4%±0.5% by volume Component A;
 (b) 4%±0.5% by volume Component B; and
 (c) the remainder is water.
Component A may be:
 (a) 50% by weight an aqueous base that is 45% by weight KOH;
 (b) 1% by weight sodium sulfate;
 (c) 0.1% by weight sodium bicarbonate;
 (d) 0.1% by weight potassium carbonate; and
 (e) the remainder may be water.
Component B may be:
 (a) 2.5% by weight Foam Ban® 753N;
 (b) 2.5% by weight Trans 30;

(c) 2.5% by weight propylene glycol;
(d) 1% by weight polysorbate 80; and
(e) the remainder may be water.

A finishing solution that is in keeping with the invention may comprise:
- (a) 0.1-19.9% by volume Component A, including all 0.1% values and ranges therebetween;
- (b) 0.1-19.9% by volume Component B, including all 0.1% values and ranges therebetween; and
- (c) water (e.g., the remainder of this finishing solution is water), where the total percent by volume of Component A and Component B does not exceed 20%.

Component A may be:
- (a) 20-60% by weight, including all 0.1% values and ranges therebetween, an aqueous base;
- (b) 0.05-10% a first caustic agent, including all 0.1% values and ranges therebetween;
- (c) 0.05-10% a second caustic agent, including all 0.1% values and ranges therebetween;
- (d) 0.05-10% a third caustic agent, including all 0.1% values and ranges therebetween;
- (e) water (e.g., the remainder of Component A may be water).

Component B may be:
- (a) 0.05-5% by weight a first antifoaming agent, including all 0.1% values and ranges therebetween;
- (b) 0.05-5% by weight a second antifoaming agent, including all 0.1% values and ranges therebetween;
- (c) 0.05-5% by weight a polyol, including all 0.1% values and ranges therebetween;
- (d) 0.5-5% by weight an emulsifier, including all 0.1% values and ranges therebetween; and
- (e) water (e.g., the remainder of Component B may be water).

The remainder of the finishing solution may be water.

In a particular example, a finishing solution that is in keeping with the invention may comprise:
- (a) 4%±0.5% by volume Component A;
- (b) 1±0.5% by volume Component B; and
- (c) water (e.g., the remainder of this finishing solution may be water).

Component A may be:
- (a) 50% by weight 45% by weight aqueous KOH;
- (b) 8.0% by weight sodium metasilicate;
- (c) 4.0% by weight trisodium phosphate;
- (d) 3.0% by weight potassium carbonate;
- (e) water (e.g., the remainder of Component A may be water).

Component B may be:
(a) 2.50% by weight Foam Ban® 753 N;
(b) 2.50% by weight Trans 30;
(c) 2.50% by weight propylene glycol;
(d) 0.5-5% by weight polysorbate 80; and
(e) water (e.g., the remainder of Component B may be water).

The invention may be embodied as a method of using a finishing solution. The steps of such a method may be sufficient to remove support material from a 3D-printed object. The method can comprise:
- (a) mixing Component A, Component B, and water, such that a finishing solution that is in keeping with the invention may be formed; and
- (b) applying the finishing solution to a 3D-printed object. Application of the finishing solution may be accomplished by spraying the finishing solution on the object, or submerging the object or a portion thereof in the finishing solution.

For example, initially, Component A (which already has water in it), Component B (which already has water in it), and water may be each in separate containers, and, from those containers, Component A and Component B may be dosed into the water at a percent-by-volume rate, such that the amount of Component A by volume is 0.1-19.9%, including all 0.1% values and ranges therebetween, and Component B by volume is 0.1-19.9%, including all 0.1% values and ranges therebetween. Such dosing of Component A and Component B may continue until a desired volume of the finishing solution is obtained. Then, the finishing solution may be applied (e.g., sprayed) to a 3D-printed object to remove undesirable support material. The operator may determine when finishing is complete by a visual and/or tactile inspection of the object.

Applying the finishing solution to an object may involve spraying, submerging, or otherwise contacting the 3D-printed object with a finishing solution that is in keeping with the invention. It should be noted, submersion of the objection when described herein includes partially or completely submerging the object in the finishing solution.

Such an application process may be carried out by initially heating the finishing solution to a desired temperature (e.g., 90-140° F., including all 0.1° F. values and ranges therebetween), and then spraying the heated finishing solution on the object, or submerging the object in the heated finishing solution. Heating the finishing solution can be achieved by using a heater, for example by heating the chamber or tank where the finishing solution is being applied and/or heating the tank in which the finishing solution is stored prior to pumping. For example, if the object is being sprayed, the chamber or tank in which the spraying occurs may be heated or the tank containing the finishing solution may be heated. If the object is being submerged in the finishing solution, a heating element may be placed in the chamber where the finishing solution contains the object.

In one embodiment of the invention, a finishing solution comprises Component A, Component B, and water, where water is at least 50-75% by volume or 50-98% by volume, including all 0.1% values and ranges therebetween, and the ratio of Component A:Component B is 1-10% Component A: 1% Component B, such that the percent by volume is 100% (e.g., 10% by volume Component A, 1% by volume Component B, and 89% by volume water, or 5% by volume Component A, 1% by volume Component B, and 94% by volume water). In such an embodiment of the invention, a 3D-printed object may be submerged in the finishing solution.

Figure 3:
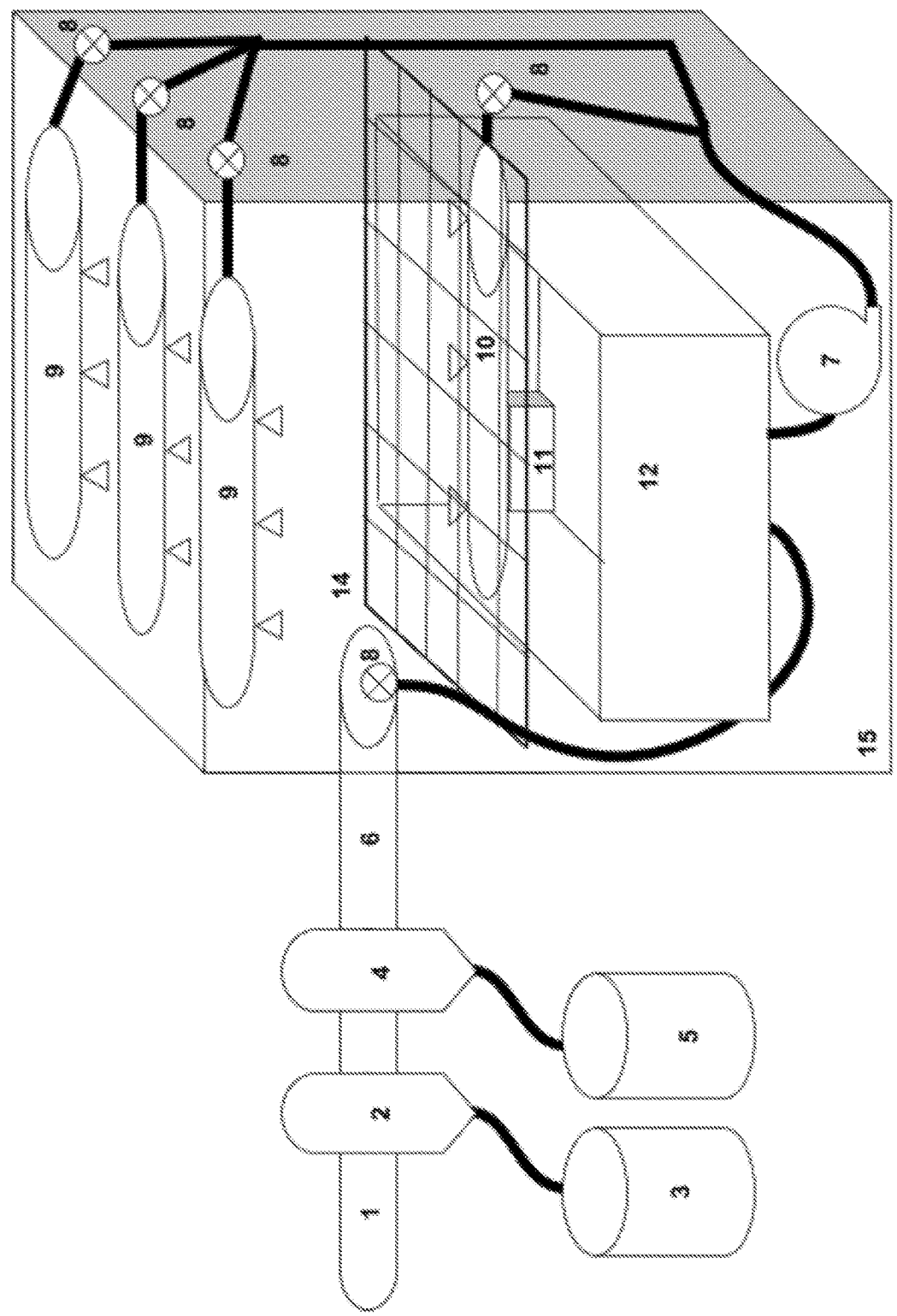
FIG. 3 is a schematic of a machine that can be used to produce a finishing solution and then spray that finishing solution on a 3D-printed object. The numbers in FIG. 3 identify a water input line (1), a first volumetric dispenser (2), a Component A container (3), a second volumetric dispenser (4), a Component B container (5), a finishing solution input line (6), a pump (7), valves (8), upper spray nozzles (9), lower spray nozzles (10), a heater (11), a tank (12), a support tray (14), and a machine housing (15).

FIG. 3 depicts a schematic of a machine that can be used to produce a finishing solution that is in keeping with the invention and then spray that finishing solution at/on an object. Prior to spraying, the finishing solution may be stored in a container (e.g., tank (12)). In that system, a pump (7) is in fluid-communication with the tank (12), and the pump (7) may be activated to move finishing solution from the tank (12) and pressurize the finishing solution to a desired pressure, such as 1-40 psi, including all 0.1 psi values and ranges therebetween. In a particular example, the pressure is 30-40 psi (e.g., 35 psi). The pumped finishing solution leaves the pump (7) and passes through at least one valve (8) that may be used to control the flow of finishing solution to at least one spray nozzle (9) that is oriented in such a way that the finishing solution is applied (e.g., sprayed on/at) to a 3D-printed object or portion thereof. Finishing solution that does not contact the 3D-printed object, and/or finishing solution that is applied to the 3D-printed object or portion thereof and is running off (e.g., dripping off) the object may be collected. The collected finishing solution can be cycled through the pump (7) and resprayed on/at the 3D-printed object, or portion thereof.

If the pH of the finishing solution is high (e.g., 11-14), the finishing solution can be sprayed onto a 3D-printed object at lower pressure (e.g., less than 10 psi) because the finishing solution can dissolve undesirable support material with less mechanical force (e.g., a force applied to the object as a result of the impact of the sprayed solution on the object) than would be the case for a less caustic solution. However, it should be noted that a highly caustic finishing solution can be sprayed at higher pressure (e.g., 10-40 psi, including all 0.1 psi values and ranges therebetween) if desired.

Figure 4:
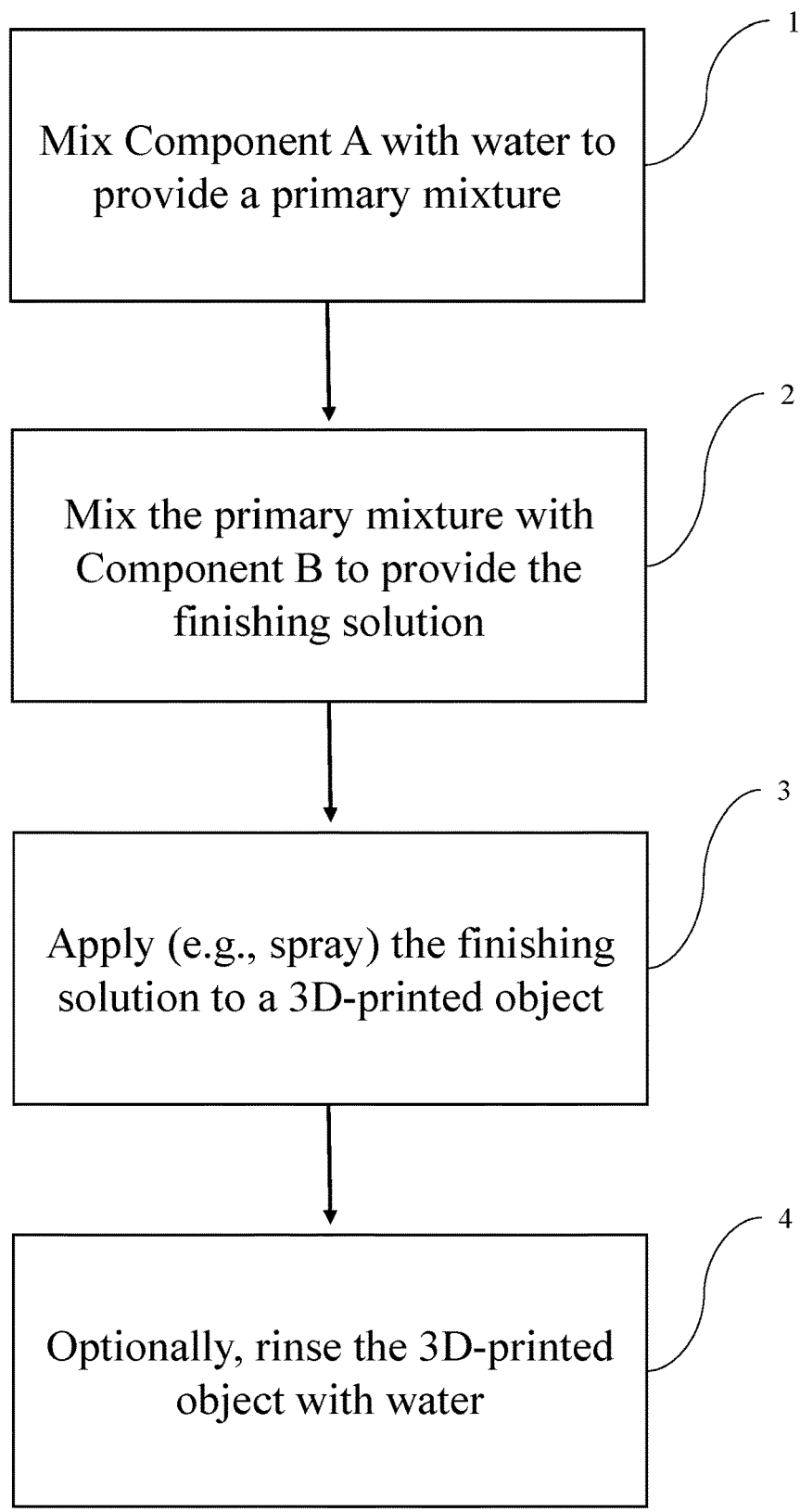
FIG. 4 shows a flow diagram of a method using a finishing solution that is in keeping with the invention.

In a particular method of using a finishing solution that is in keeping with the invention (FIG. 4):

(i) Component A and Component B are arranged in separate containers (e.g., container (3) and container (5) in FIG. 3), each having its own volumetric chemical dispenser (2) and (4) (e.g., a DOSATRON®), where each volumetric chemical dispenser is arranged in series with a water input line (1). For example, FIG. 3 shows a water input line (1) connected to the first volumetric chemical dispenser (2), and that first volumetric chemical dispenser (2) draws Component A from container (3).

(ii) The water enters the first volumetric chemical dispenser (2) and is dosed (e.g., mixed) with Component A at a desired percent by volume rate.

(iii) The water/Component A solution then enters the second volumetric chemical dispenser (4) and is dosed (e.g., mixed) with Component B at a desired percent by volume rate, thus forming the finishing solution.

(iv) The finishing solution then enters a holding tank (12) until the tank (12) holds a desired volume. The holding tank (12) may be associated with a machine, such as, for example, the Post Process BASE/DECI, and the tank (12) may be filled until a level sensor detects that a desired amount of the finishing solution is in the holding tank (12). Once the level sensor detects a desired level, the flow of finishing solution into the tank (12) may be stopped.

(v) A heater (11) may be arranged within the tank (12) to heat the finishing solution to a desired temperature (e.g., heat to a temperature of 90-140° F.) and maintain that temperature during application (e.g., spraying).

(vi) A pump (7) may be in fluid communication with the tank (12) and when activated, the pump (7) moves finishing solution from the tank (12) raises the pressure of the finishing solution, and sends the pressurized finishing solution to at least one valve (8). The pressure of the finishing solution at the pump discharge can be a pressure from 1 to 35 psi, including all 0.1 psi values therebetween.

(vii) The finishing solution may pass through at least one valve (8) (e.g., a series of valves) that control flow to the at least one nozzle (9). The rate at which finishing solution is applied may vary from 40-75 gallons/minute.

(viii) Due to the pressure drop across the nozzle (9), the finishing solution is sprayed by the at least one nozzle (9) in order to apply the finishing solution on a 3D-printed object in order to remove undesirable material.

(ix) Located below the 3D-printed object may be the tank (12), and the finishing solution that has been sprayed may be collected in the tank (12).

(x) The finishing solution may be applied until the desired amount of undesirable material is removed.

(xi) The finished object may be then optionally rinsed with water to remove finishing solution that may remain on the object.

With regard to (viii), the machine (e.g., the Post Process BASE/DECI) may have a plurality of nozzles (9). For example, in the DECI machine, there is a single set of nozzles controlled by a single valve (8) (e.g., a single valve arranged below a support tray (14) on which the 3D-printed object is placed during the application process). The support tray (14) can be perforated to allow the finishing solution to pass from the top of the support tray to a space below the support tray (14). There can also be other sets of nozzles (9) positioned above the support tray (14) and oriented so that the finishing solution is sprayed down toward the object. Each set of nozzles (9) may be associated with its own flow control valve (8) to permit control of the flow of finishing solution to that nozzle set (9). In some embodiments of the invention, the nozzles (9) can be moved in the horizontal axis (i.e., substantially perpendicular to gravity) via electric motors to ensure more even application of the finishing solution to the object.

The following Statements describe non-limiting examples that are in keeping with the present invention.

Statement 1. The finishing solution for finishing an object, comprising:
0.0002-20% by weight a base;
optionally, 0.0005-2.5% by weight a first caustic agent;
optionally, 0.0005-2.5% by weight a second caustic agent;
optionally, 0.0005-5.0% by weight a third caustic agent;
optionally, 0.0005-5.0% by weight an emulsifier;
optionally, up to 1% by weight a filler;
0.35-49.5% by weight a polyol;
0.005-15% by weight a first antifoaming agent;
optionally, 0.005-15% by weight a second antifoaming agent; and
water, where the finishing solution has a pH of 11 or above.

Statement 2. A finishing solution according to Statement 1, comprising:
0.0002-6% by weight a base;
up to 1% by weight the filler;
up to 1% by weight the first caustic agent;
0.001-2% by weight the first antifoaming agent;
0.001-2% by weight the polyol;
0.0005-1% by weight the emulsifier; and
water, where the finishing solution has a pH of 11 or above.

Statement 3. A finishing solution according to Statement 1 or Statement 2, where the base is an aqueous solution, that is 1 to 50% by weight a base.

Statement 4. A finishing solution according to any one of the preceding Statements, where the base is chosen from lithium hydroxide, sodium hydroxide, potassium hydroxide, rubidium hydroxide, cesium hydroxide, magnesium hydroxide, calcium hydroxide, strontium hydroxide, barium hydroxide, and the like, and combinations thereof.

Statement 5. A finishing solution according to any one of the preceding Statements, where the filler is sodium sulfate.

Statement 6. A finishing solution according to any one of the preceding Statements, where the first caustic agent and second caustic agent are chosen from potassium bicarbonate, sodium bicarbonate, potassium carbonate, sodium carbonate, aluminum phosphate, calcium phosphate, dicalcium phosphate, magnesium phosphate, monopotassium phosphate, dipotassium phosphate, tripotassium phosphate, potassium phosphate, sodium phosphate, disodium phosphate, trisodium phosphate, sodium aluminum phosphate, sodium potassium phosphate, calcium potassium phosphate, calcium sodium phosphate, and the like, and combinations thereof.

Statement 7. A finishing solution according to any one of the preceding Statements, where the first caustic agent and the second caustic agent are a conjugate acid/base pair.

Statement 8. A finishing solution according to any one of the preceding Statements, where the third caustic agent is sodium silicate or sodium metasilicate.

Statement 9. A finishing solution according to any one of the preceding Statements, where the first caustic agent is potassium/sodium carbonate and the second caustic agent is potassium/sodium bicarbonate.

Statement 10. A finishing solution according to any one of the preceding Statements, where the first antifoaming agent and second antifoaming agent are chosen from Foam Ban® 136B, Foam Ban® 149, Foam Ban® 152, Foam Ban® 155, Foam Ban® 157, Foam Ban® 159, Foam Ban® 169, Foam Ban® 182, Foam Ban® 225D, Foam Ban® 260D, Foam Ban® 2642, Foam Ban® 2901, Foam Ban® 3505, Foam Ban® 3529B, Foam Ban® 3555, Foam Ban® 3588G, Foam Ban® 3633E, Foam Ban® 3744, Foam Ban® 3806, Foam Ban® 625, Foam Ban® C277, Foam Ban® CL-100E, Foam Ban® CL-125E, Foam Ban® CL-150D, Foam Ban® HP705, Foam Ban® HP710, Foam Ban® HP720, Foam Ban® HP730, Foam Ban® HP732, Foam Ban® HP738, Foam Ban® HP740, Foam Ban® HP753, Foam Ban® HP777, Foam Ban® HV-810G, Foam Ban® HV-820G, Foam Ban® HV-821, Foam Ban® HV-825G, Foam Ban® HV-860, Foam Ban® MS-293, Foam Ban® MS-30, Foam Ban® MS-455N, Foam Ban® MS-525, Foam Ban® MS-550, Foam Ban® MS-575, Foam Ban® MS-5A, Foam Ban® MS-909B, Foam Ban® SB-1, Foam Ban® SB-21, Foam Ban® SB-73, Foam Ban® SB-8, Foam Ban® SB-81, Foam Ban® SB-88, Foam Ban® TK-100, Foam Ban® TK-150, Foam Ban® TK-200, Foam Ban® TK-201, Foam Ban® TK-75, Foam Ban® TS-3618, Foam Ban® TS-7250, Foam Ban® XRM-3599B, Trans 30, and the like, and combinations thereof.

Statement 11. A finishing solution according to any one of the preceding Statements, where the polyol is chosen from ethylene glycol, propylene glycol, methoxytriglycol, ethoxytriglycol, butoxytriglycol, diethylene glycol n-butyl 30 ether acetate, diethylene glycol monobutyl ether, ethylene glycol n-butyl ether acetate, ethylene glycol monobutyl ether, diethylene glycol monoethyl ether, DOWANOL™ DPH 255, ethylene glycol phenyl ether, diethylene glycol monohexyl ether, ethylene glycol monohexyl ether, diethylene glycol monomethyl ether, ethylene glycol monopropyl ether, di(propylene glycol) methyl ether, dipropylene glycol methyl ether acetate, dipropylene glycol n-butyl ether, propylene glycol diacetate, propylene glycol methyl ether, propylene glycol monomethyl ether acetate, propylene glycol n-butyl ether, propylene glycol phenyl ether, tripropylene glycol methyl ether, tripropylene glycol n-butyl ether, dipropylene glycol dimethyl ether, 2-butoxyethanol, and the like, and combinations thereof.

Statement 12. A finishing solution according to any one of the preceding Statements, where the emulsifier is chosen from polysorbates, soaps, fatty acid sulfonates, ethoxylated compounds, such as ethoxylated propylene glycol, lecithin, polygluconates, quaternary ammonium fatty acid adducts, lignin sulfonates, sodium dodecyl sulfate, lauryl dimethyl amine oxide, cetyltrimethylammonium bromide (CTAB), polyethoxylated alcohols, polyoxyethylene sorbitan, Octoxynol, bile salts (sodium deoxycholate, sodium cholate), polyoxyl castor oil, cyclodextrins, sodium caprylate, polysorbate 20, polysorbate 40, polysorbate 60, polysorbate 80, and the like, and combinations thereof.

Statement 13. A finishing solution according to any one of the preceding Statements, where:
the base is aqueous potassium hydroxide having 45% by weight potassium hydroxide;
the filler is sodium sulfate;
the first caustic agent is sodium bicarbonate;
the second caustic agent is potassium carbonate;
the first antifoaming agent is Foam Ban® 753N;
the second antifoaming agent is Trans 30;
the polyol is propylene glycol; and
the emulsifier is polysorbate 80.

Statement 14. A finishing solution according to any one of the preceding Statements, where: the base is aqueous potassium hydroxide having 45% by weight potassium hydroxide;
the first caustic agent is potassium carbonate;
the second caustic agent is trisodium phosphate;
the third caustic agent is sodium metasilicate;
the polyol is propylene glycol;
the surfactant/emulsifier is Polysorbate 80;
the first antifoaming agent is Trans 30; and
the second antifoaming agent is Foam Ban® 753N.

Statement 15. A finishing solution according to any one of the preceding Statements, where the finishing solution is formed by mixing a Component A, a Component B, and water, such that the total volume percent of Component A and Component B combined does not exceed 20% by volume, where:
Component A comprises:
the aqueous base,
the filler,
the first caustic agent,
the second caustic agent,
water; and
where Component A has a pH of 13 or above; and
Component B comprises:
the first antifoaming agent,
the second antifoaming agent,
the polyol,
the emulsifier, and
water.

Statement 16. A finishing solution according to any one of the preceding Statements, comprising:
0.1-19.9% by volume Component A, where Component A comprises:
20-60% by weight the aqueous base,
up to 5% by weight the filler,
up to 5% by weight the first caustic agent,
up to 5% by weight the second caustic agent, and
water;
0.1-19.9% by volume Component B; where Component B comprises:
up to 10% by weight the first antifoaming agent,
up to 10% by weight the second antifoaming agent,
1-10% by weight the polyol,
0.5-5% by weight the emulsifier, and
water.

Statement 17. A finishing solution according to any one of the preceding claims, comprising:
4%±0.5% by volume Component A, where Component A includes:
50% by weight aqueous potassium hydroxide having 45% by weight potassium hydroxide,
1% by weight sodium sulfate,
0.1% by weight sodium bicarbonate,
0.1% by weight potassium carbonate, and
48.8% by weight water; and
4%±0.5% by volume Component B, where Component B includes:
2.5% by weight Foam Ban® 753N,
2.5% by weight Trans 30,
2.5% by weight propylene glycol,
1% by weight polysorbate 80, and
91.5% by weight water.

Statement 18. A finishing solution according to any one of the preceding Statements, where the finishing solution is formed by mixing a Component A, a Component B, and water, such that the total volume percent of Component A and Component B combined does not exceed 20% by volume, where:
Component A comprises:
the aqueous base,
the filler,
the first caustic agent,
the second caustic agent,
the third caustic agent, and
water; and
Component B comprises:
the polyol,
the emulsifier
the first antifoaming agent,
the second antifoaming agent, and
water.

Statement 19. A finishing solution according to any one of the preceding Statements, comprising:
0.1-19.9% volume Component A, where Component A comprises:
20-60% by weight the aqueous base,
0.05-10.0% by weight the first caustic agent,
0.05-10.0% by weight the second caustic agent,
0.05-10.% by weight the third caustic agent, and
water; and
0.1-19.9% volume Component B; where Component B comprises:
0.05-5.0% by weight the polyol,
0.05-5.0% by weight the emulsifier,
0.05-5.0% by weight the first antifoaming agent,
0.05-5.0% by weight the second antifoaming agent, and
water.

Statement 20. A finishing solution according to any one of the preceding Statements, comprising:
4%±0.5% by volume Component A, where Component A comprises:
50% by weight 45% by weight aqueous KOH,
8.0% by weight sodium metasilicate,
4.0% by weight trisodium phosphate,
3.0% by weight potassium carbonate, and
the remainder is water; and
1%±0.5% by volume Component B, where Component B comprises:
2.50% propylene glycol,
2.50% Foam Ban® 753 N,
2.50% Trans 30,
1.00% Polysorbate 80, and
the remainder is water.

Statement 21. A method of removing support material from an object comprising:
i) applying a finishing solution of any one of the preceding Statements, where the support material is removed from the object or a portion thereof; and
ii) removing the finishing solution from the object.

Statement 22. A method according to Statement 21, where the support material resulted from a Polyjet printing process or a fused deposition modeling (FDM) process.

Statement 23. A method according to Statement 21 or Statement 22, further comprising heating the finishing solution.

Statement 24. A method according to Statement 23, where the finishing solution is heated to a temperature of 115 to 150° F., including all 0.01° F. values and ranges therebetween.

Statement 25. A method according to any one of Statements 21-24, where applying the finishing solution includes raising the pressure of the finishing solution to a pressure of 1-40 psi.

Statement 26. A method according to any one of Statements 21-25, where the finishing solution is formed by mixing a Component A according to any one of Statements 15-17, a Component B according to any one of Statements 15-17, and water.

Statement 27. A method according to Statement 26, where the undesirable material is selected from the group consisting of SR20, SR30, SR35, SR100, SR110, and combinations thereof.

Statement 28. A method according to any one of Statements 21-25, where the finishing solution is formed by mixing a Component A according to any one of Statements 18-20, a Component B according to any one of Statements 18-20, and water.

Statement 29. A method according to Statement 28, where the undesirable material is selected from the group consisting of SUP705, SUP706, SUP708, and combinations thereof.

The following examples are presented to illustrate certain aspects of the invention. However, these examples are not intended to limit the scope of the invention in any way.

Example 1

This example describes a method of using a finishing solution that is in keeping with the invention. A 3D-printed object (a cube) was printed using FDM techniques (FIGS. 1A-1F). The cube was entirely support material comprising SR30. A finishing solution was applied (e.g., sprayed) to the cube. The finishing solution was 3.84% by volume Component A, 4% by volume Component B, and 92.16% by volume water.
Component A included:
50% by weight aqueous potassium hydroxide having 45% by weight potassium hydroxide,
1% by weight sodium sulfate,
0.10% by weight sodium bicarbonate,
0.10% by weight potassium carbonate, and
48.80% by weight water; and
Component B included:
2.5% by weight Foam Ban® 753N,
2.5% by weight Trans 30,
2.5% by weight propylene glycol,
1% by weight polysorbate 80, and
91.5% by weight water.

To make the finishing solution, Component A and Component B were arranged in separate containers (3 and 5) (see FIG. 3). The inputs of the first volumetric chemical dispenser (e.g., DOSATRON®) were connected to a water line and Component A. The first volumetric chemical dispenser dispensed 4% Component A (4:96, Component A: water) and delivered that 4% Component A to a second volumetric chemical dispenser that was placed in series with the first volumetric chemical dispenser. The second volumetric dispenser dispensed 4% Component B (4:96, Component B: Component A/water) into a tank (12).

The 3D-printed cube was then placed on a perforated support tray (14) with the open tank (12) directly beneath the perforated support tray (14) and the finishing solution was applied to the cube by spraying. The finishing solution was applied to the cube using a "Post Process SR BASE" machine. The 3D-printed cube was sprayed for approximately 300 minutes, with the pump discharge pressure at 18-24 psi, and a rate of 40-75 gallons/minute for the entire duration of application. The finishing solution was sprayed at a temperature of 120° F. Progress of the finishing was determined every 60 minutes via visual inspection performed by the operator. After the cube was sprayed, the cube was rinsed with water for approximately 1 minute. The cube resulting from this procedure is shown in FIGS. 1C-1F.

Example 2

This example describes a method of using a finishing solution that is in keeping with the invention. A 3D-printed object (a chain) was printed using FDM techniques (FIGS. 2A-2E). The chain comprised ASA and the support material comprised SR30. The following finishing solution was applied (e.g., sprayed) to the chain. The finishing solution was 3.84% by volume Component A, 4% by volume Component B, and 92.16% by volume water.

Component A included:
50% by weight aqueous potassium hydroxide having 45% by weight potassium hydroxide,
1% by weight sodium sulfate,
0.10% by weight sodium bicarbonate,
0.10% by weight potassium carbonate, and
48.80% by weight water; and
Component B included:
2.5% by weight Foam Ban® 753N,
2.5% by weight Trans 30,
2.5% by weight propylene glycol,
1% by weight polysorbate 80, and
91.5% by weight water.

To make the finishing solution, Component A and Component B were arranged in separate containers (3 and 5) (see FIG. 3). The inputs of the first volumetric chemical dispenser (e.g., DOSATRON®) were connected to a water line and Component A.

The first volumetric chemical dispenser dispensed 4% Component A (4:96, Component A: water) and delivered that 4% Component A to a second volumetric chemical dispenser that was placed in series with the first volumetric chemical dispenser. The second volumetric dispenser dispensed 4% Component B (4:96, Component B: Component A/water) into a tank (12).

Figure 2A:
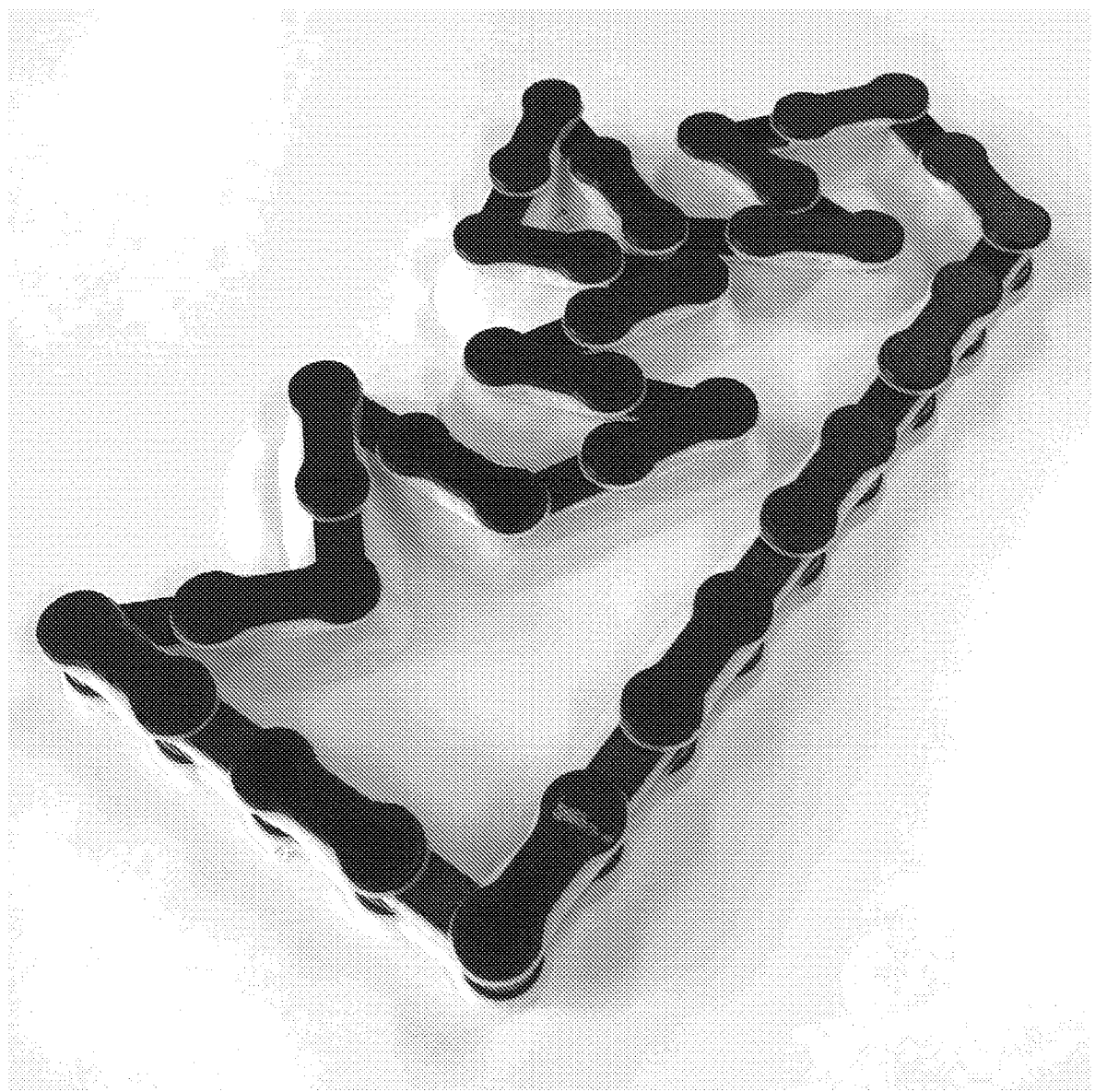
FIG. 2A-2E are photos of an object (a chain) that was made by FDM.
Figure 2B:
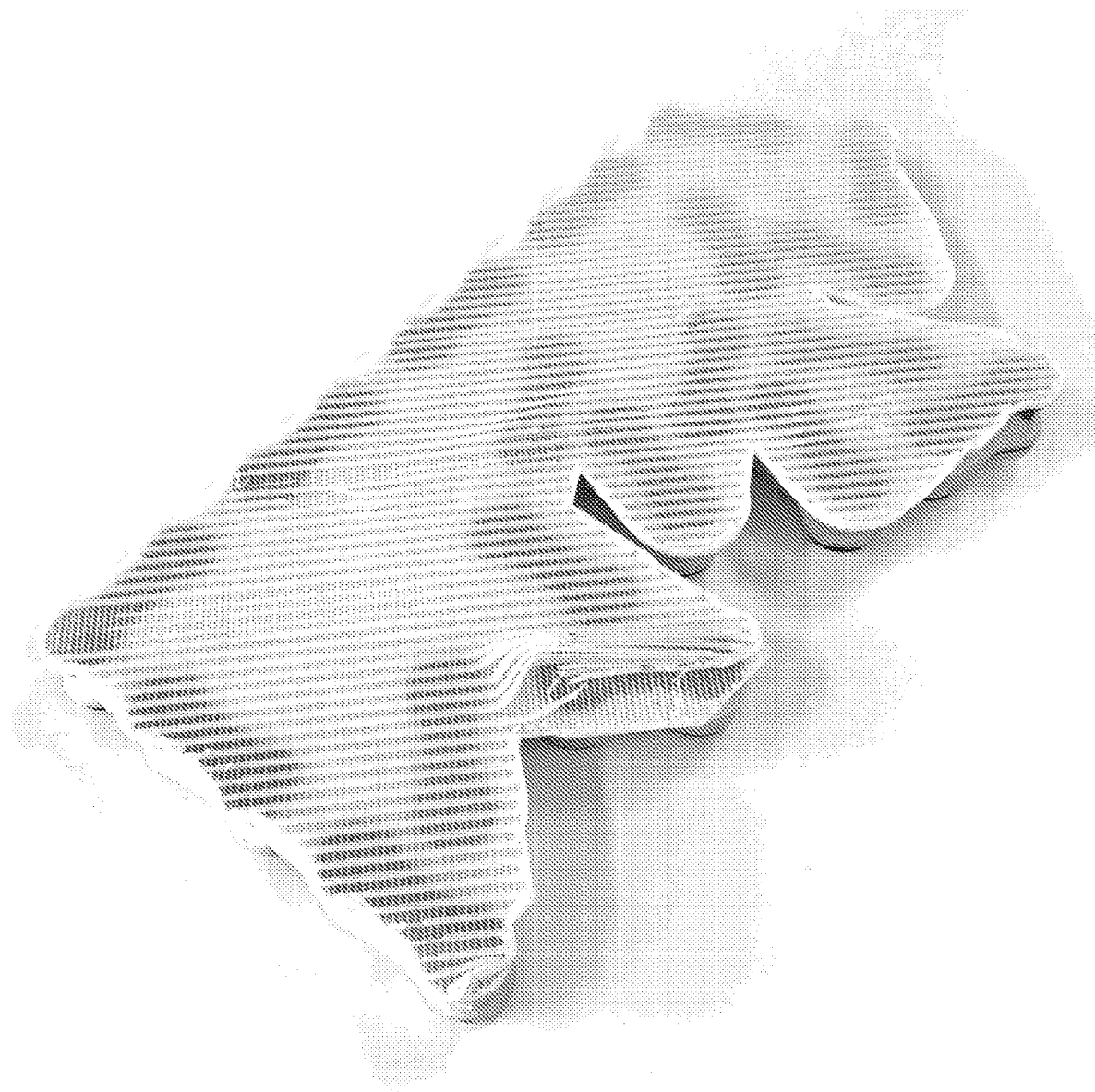
Figure 2C:
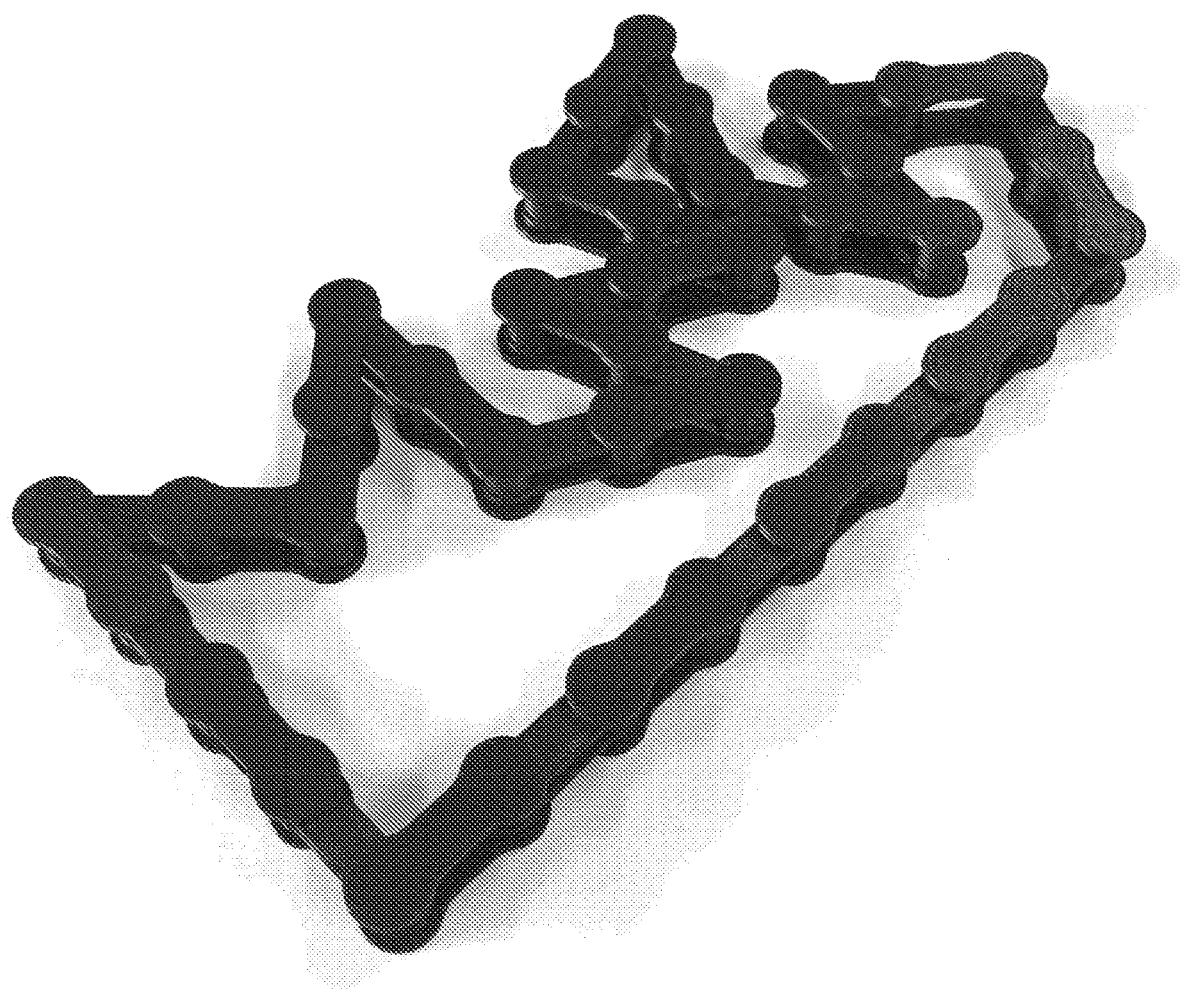
Figure 2D:
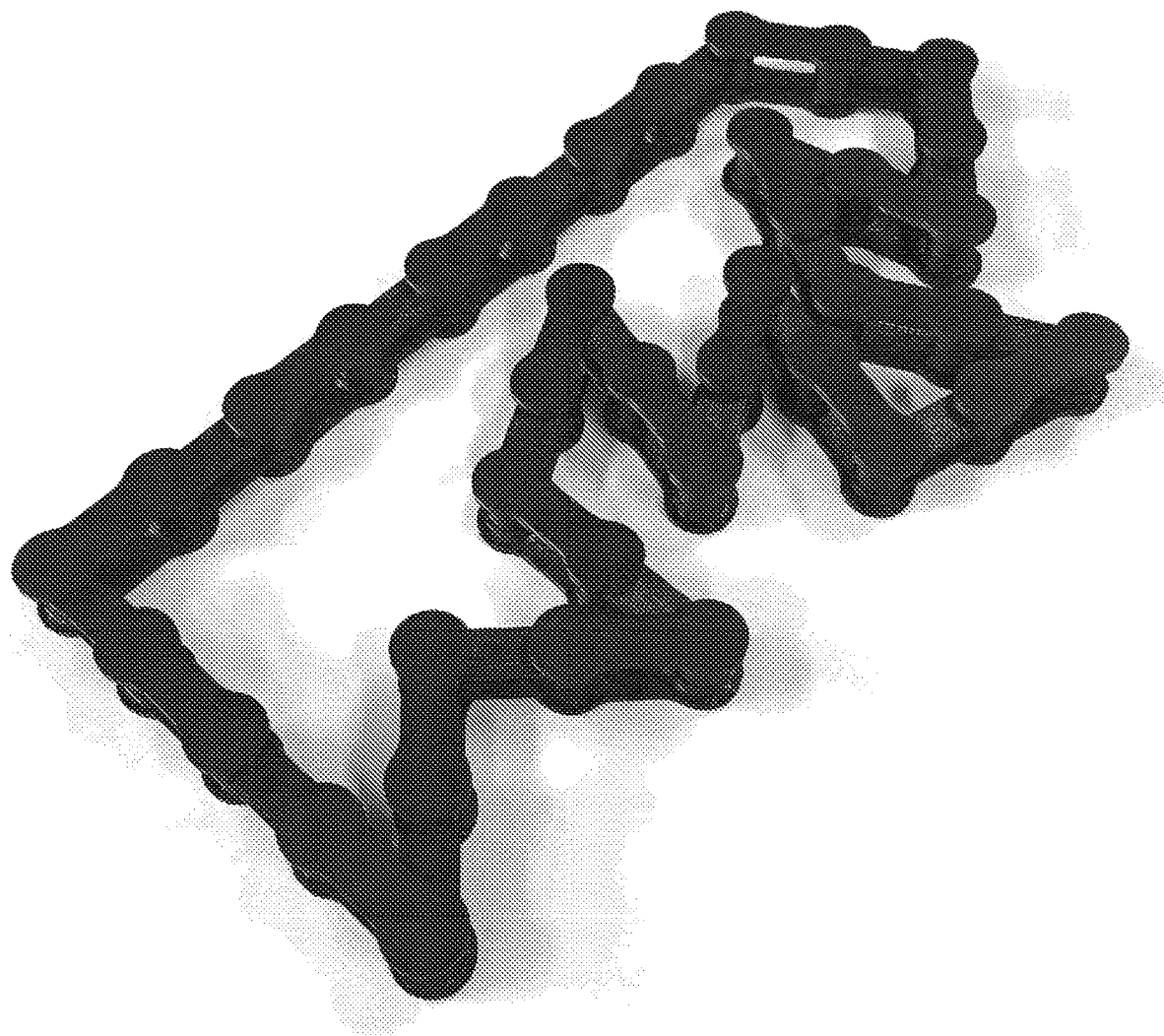
Figure 2E:
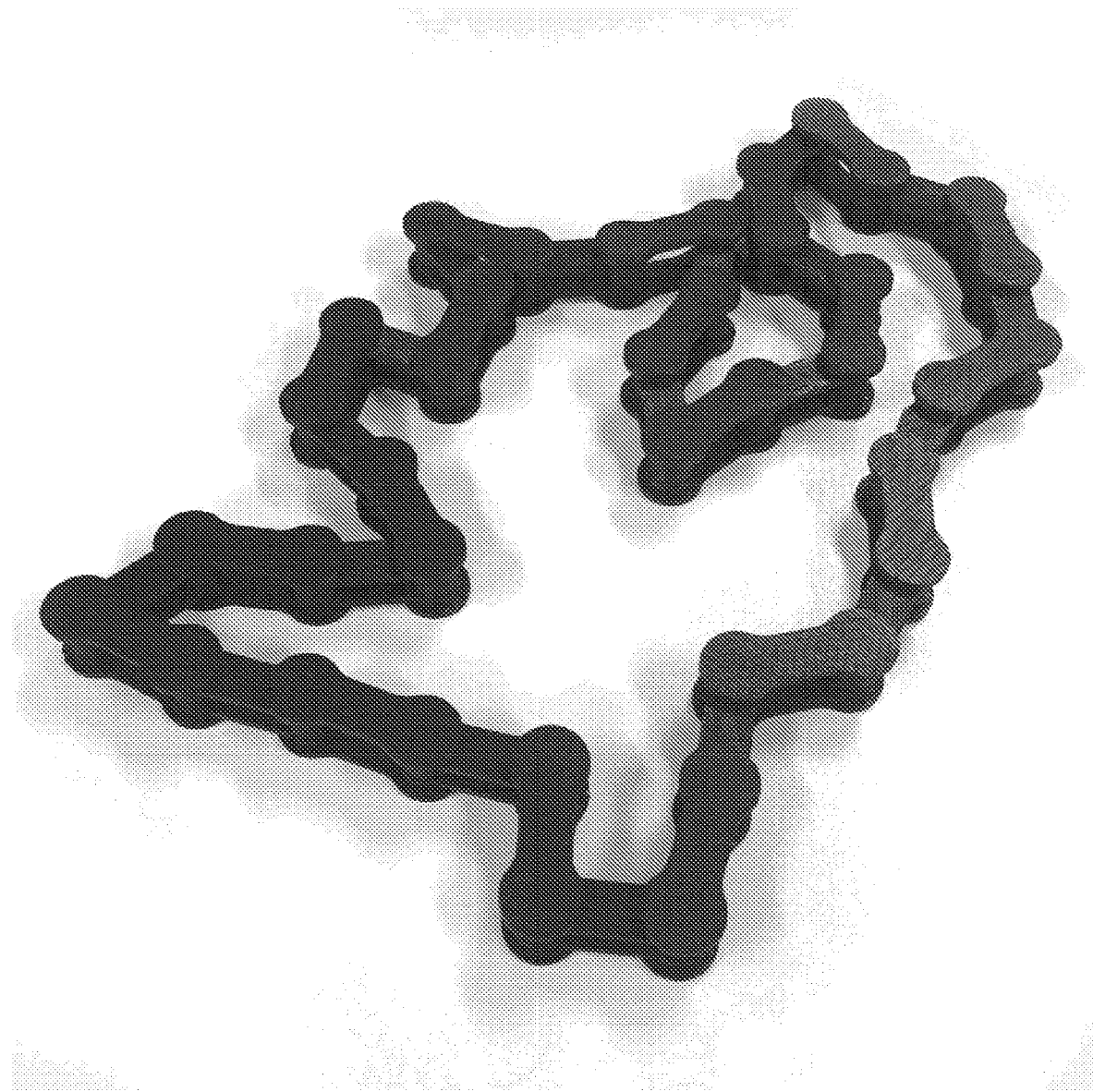

The 3D-printed chain was then placed on a perforated support tray (14) with the open tank (12) directly beneath the perforated support tray (14) and the finishing solution was applied to the chain by spraying. The finishing solution was applied to the chain and support material using a "Post Process SR BASE" machine. The 3D-printed chain was sprayed for approximately 120 minutes, with the average pump discharge pressure at 25 psi, and an average rate of 75 gallons/minute for the entire duration of application. The pump discharge pressure varied from 18-30 psi. The finishing solution was sprayed at a temperature of 130° F. Progress of the finishing was determined every 60 minutes via visual inspection performed by the operator. After the chain was sprayed, the chain was rinsed with water for approximately 1 minute. The chain resulting from this procedure (e.g., with support material removed) is shown in FIGS. 2C-2E.

Example 3

This example describes a method of use of a finishing solution that is in keeping with the invention.

A 3D-printed object (FIGS. 2A and 2B) was printed using FDM techniques. The object comprised ABS polycarbonate, and the support material comprised SR30. The finishing solution used to remove the support material was:
4% by volume Component A;
1% by volume Component B; and
the remainder is water.
Component A was:
50% by weight 45% by weight aqueous KOH;
8.0% by weight sodium metasilicate
4.0% by weight trisodium phosphate;
3.0% by weight potassium carbonate; and
the remainder was water.
Component B was:
2.50% Propylene Glycol
2.50% Foam Ban® 753 N
2.50% Trans 30
1.00% Polysorbate 80
the remainder was water.

The finishing solution was applied to the object using a "Post Process SR DECI" machine. Briefly, Component A and Component B were arranged in separate containers (3, 5) (see FIG. 3). The inputs of the first volumetric chemical dispenser (2) (e.g., DOSATRON®) were connected to a water line (1) and a first tank (3) holding Component A. The volumetric chemical dispenser (2) dispensed a mixture of 5% Component A (5:95, Component A: water) into a second volumetric chemical dispenser (4) that was placed in series with the first volumetric chemical dispenser (2). The second volumetric dispenser (4) dispensed a mixture of 5% Component B (5:95, Component B: Component A/water) into a tank (12). The 3D-printed object was then placed on a perforated support tray (14) with the open tank (12) directly beneath the perforated support tray (14) and the finishing solution was applied to the object by spraying. The 3D-printed object was sprayed for approximately 40 minutes, with the pump discharge pressure at 35 psi, and a rate of 40 gallon/minute for the entire duration of application. The finishing solution was sprayed at a temperature of 100-130° F. After the object was sprayed, the object was rinsed with water for approximately 1 minute. The object resulting from this procedure (e.g., with support material removed) is shown in FIGS. 2C and 2D.

It will be appreciated that various aspects of the above-disclosed invention and other features and functions, or alternatives thereof, may be desirably combined into many other different systems or applications. Various alternatives, modifications, variations, or improvements therein may be subsequently made by those skilled in the art, and these are also intended to be encompassed by the invention. Although embodiments of the invention have been described herein, the invention is not limited to such embodiments. Hence, the present invention is deemed only limited by the appended claims and the reasonable interpretation thereof.

What is claimed is:

1. A method of removing support material from an additively manufactured object comprising:
   i) applying a finishing solution to the support material present on the additively manufactured object, the finishing solution comprising:
      0.0002-20% by weight a base;
      0.35-49.5% by weight a polyol;
      0.005-15% by weight a first antifoaming agent; and
      water,
      wherein the finishing solution has a pH of 11 or above,
   ii) removing the support material from the additively manufactured object or a portion thereof; and
   iii) removing the finishing solution from the additively manufactured object.

2. The method of claim 1, wherein the support material resulted from a Polyjet printing process or a fused deposition modeling (FDM) process.

3. The method of claim 1, further comprising heating the finishing solution.

4. The method of claim 1, further comprising heating the finishing solution to a temperature of 115 to 150° F.

5. The method of claim 1, further comprising applying the finishing solution at a pressure of 1-40 psi.

6. A method of removing support material from an additively manufactured object comprising:
   i) forming a finishing solution by mixing a Component A and a Component B, wherein:
      Component A, having a pH of 13 or above, comprises:
         an aqueous base,
         a filler,
         a first caustic agent, and
         a second caustic agent, and
      Component B comprises:
         a first antifoaming agent,
         a second antifoaming agent,
         a polyol,
         an emulsifier, and
         water
   ii) applying the finishing solution to the support material present on the additively manufactured object;
   iii) removing the support material from the additively manufactured object or a portion thereof; and
   iv) removing the finishing solution from the additively manufactured object.

* * * * *